(12) United States Patent
Nguyen et al.

(10) Patent No.: US 10,857,640 B1
(45) Date of Patent: Dec. 8, 2020

(54) LIFT ASSIST AND TRANSFER ASSEMBLY AND METHOD OF USE

(71) Applicant: Honda Motor Co., Ltd., Tokyo (JP)

(72) Inventors: Khoi Nguyen, Ontario (CA); Mingyang Wu, Ontario (CA); Richard Stephenson, Ontario (CA)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/559,727

(22) Filed: Sep. 4, 2019

(51) Int. Cl.
*B23Q 7/04* (2006.01)
*B66C 19/00* (2006.01)
*B23Q 7/14* (2006.01)
*B65G 9/00* (2006.01)

(52) U.S. Cl.
CPC ............... *B23Q 7/048* (2013.01); *B23Q 7/14* (2013.01); *B66C 19/00* (2013.01); *B65G 9/00* (2013.01)

(58) Field of Classification Search
None
See application file for complete search history.

(56) References Cited

U.S. PATENT DOCUMENTS

| | | | | |
|---|---|---|---|---|
| 657,166 A | * | 9/1900 | Jones | A63G 21/22 104/113 |
| 1,625,347 A | * | 4/1927 | Bankson | B65G 9/002 104/164 |
| 1,879,815 A | * | 9/1932 | Lullau | B66C 23/22 104/164 |
| 3,471,040 A | * | 10/1969 | Field | B66C 17/00 414/141.7 |
| 4,958,574 A | * | 9/1990 | Meindl | B61B 12/022 104/178 |
| 5,423,733 A | | 6/1995 | Adachi | |
| 7,484,616 B2 | | 2/2009 | Nakamura | |

FOREIGN PATENT DOCUMENTS

| | | |
|---|---|---|
| CN | 203033888 U | 7/2013 |
| CN | 102530732 A | 5/2014 |
| CN | 103803284 A | 5/2014 |
| CN | 206031914 U | 3/2017 |

(Continued)

OTHER PUBLICATIONS

Espacenet Machine Translation of CN Patent No. 203033888 U.

(Continued)

*Primary Examiner* — William R Harp
(74) *Attorney, Agent, or Firm* — Plumsea Law Group, LLC

(57) ABSTRACT

A lift assist and transfer assembly for lifting and moving a component through a travel distance is described. The assembly includes an overhead rail mounted to a ceiling of a work environment. The rail has a first end and a second end, corresponding to a loading area and a work area defining the travel distance. A carriage is slidably attached to the rail for supporting the component and a pneumatic cylinder element at the second end of the rail is attached an overhead fixture of the ceiling. The pneumatic cylinder element is biased into a retracted position and extends to an extended position upon actuation to move the second end of the rail downward. The carriage slides along the rail from the first end to the second end upon actuation of the cylinder to displace the second end of the rail such that the rail has a downward slope.

20 Claims, 10 Drawing Sheets

(56) References Cited

FOREIGN PATENT DOCUMENTS

CN    207293476 U    5/2018
CN    208054787 U    11/2018

OTHER PUBLICATIONS

Espacenet Machine Translation of CN Patent No. 102530732 A.
Espacenet Machine Translation of CN Patent No. 103803284 A.
Espacenet Machine Translation of CN Patent No. 206031914 U.
Espacenet Machine Translation of CN Patent No. 207293476 U.
Espacenet Machine Translation of CN Patent No. 208054787 U.

* cited by examiner

LIFT ASSIST AND TRANSFER ASSEMBLY AND METHOD OF USE

BACKGROUND

The embodiments relate generally to a lift assist and transfer assembly and method of use, and, more particularly, to lift assist and transfer assembly that uses gravity to move components along a rail.

Many manufacturing facilities and other industrial environments employ mechanisms to assist with lifting and/or moving parts and components for assembly. Using these mechanisms, factory workers are able to load parts or components and move them into position to be worked on or assembled at various work stations around the facility.

A variety of assistive mechanisms have been provided to aid workers in these environments. However, these conventional assistive mechanisms can suffer from several drawbacks. For example, some conventional mechanisms require two operators or workers to guide parts or components between different areas within the facility. Accordingly, manpower efficiency in these situations is poor, as one worker may be idle while the other worker loads a part or component onto the mechanism. Additionally, because the workers must both help guide the part to its destination, there may be an excessive amount of walking between the different areas within the facility.

Other types of assistive mechanisms may be overly complex, requiring extensive training for operation and leading to costly repairs and down time when the mechanism is out of operation. Such complex mechanisms can require large investment costs to initially equip a facility and may also be expensive to re-configure or otherwise change the arrangement of work stations within the facility.

There is a need in the art for an improved lift assist and transfer assembly for moving components in a work environment.

SUMMARY

The techniques of the present embodiments described herein provide a lift assist and transfer assembly configured to move components to a work station in a work environment and a method for using a lift assist and transfer assembly to move a component.

In one aspect, a lift assist and transfer assembly for lifting and moving a component through a travel distance is provided, the assembly comprising: an overhead rail mounted to a ceiling of a work environment, the overhead rail having a first end and a second end, corresponding to a loading area and a work area, respectively, defining the travel distance; a carriage slidably attached to the overhead rail for supporting the component thereon; and a pneumatic cylinder element disposed at the second end of the overhead rail and having a lower attachment point on the second end of the overhead rail and an upper attachment point on an overhead fixture of the ceiling, the pneumatic cylinder element being biased into a retracted position and configured to extend to an extended position upon actuation, thereby moving the second end of the overhead rail downward; wherein the carriage is configured to slide along the overhead rail from the first end to the second end upon actuation of the pneumatic cylinder element at the second end of the overhead rail to displace the second end of the overhead rail such that the overhead rail has a downward slope in a direction of the second end.

In another aspect, a lift assist and transfer assembly for lifting and moving components through a travel distance is provided, the assembly comprising: at least two overhead rails mounted to a ceiling of a work environment, each overhead rail having, each rail having a lift end and a work end, corresponding to a loading area and a work area, respectively, defining the travel distance; a carriage slidably attached to each overhead rail; and a pneumatic cylinder element disposed at the work end of each overhead rail and attached to an overhead fixture of the ceiling; and wherein each carriage is configured to slide along the overhead rail from the lift end to the work end upon actuation of the pneumatic cylinder element at the work end of the overhead rail to displace the work end of the overhead rail such that the overhead rail has a downward slope in a direction of the work end.

In another aspect, a method for using a lift assist and transfer assembly to move a component through a travel distance is provided, the method comprising: selecting a component to be moved using a lift assist and transfer assembly comprising an overhead rail mounted to a ceiling of a work environment, a carriage, and a pneumatic cylinder element attached to an overhead fixture of the ceiling at one end of the overhead rail; determining a weight of the selected component; calculating a cylinder stroke length for the pneumatic cylinder element based on at least: (i) the travel distance between a loading area where the selected component is attached to the carriage at a lift end of the overhead rail of the assembly and a work station where the selected component is to arrive, and (ii) the determined weight of the selected component; and actuating the pneumatic cylinder element by the calculated cylinder stroke length from a retracted position to an extended position, thereby moving a work end of the overhead rail in a downward direction to slide the carriage along the overhead rail through the travel distance to move the selected component to the work station.

Other systems, methods, features and advantages of the exemplary embodiments will be, or will become, apparent to one of ordinary skill in the art upon examination of the following figures and detailed description. It is intended that all such additional systems, methods, features and advantages be included within this description and this summary, be within the scope and protected by the claims.

BRIEF DESCRIPTION OF THE DRAWINGS

The exemplary embodiments may be better understood with reference to the following drawings and description. The components in the figures are not necessarily to scale. Moreover, in the figures, like reference numerals designate corresponding parts throughout the different views.

DETAILED DESCRIPTION

The example embodiments described herein provide a lift assist and transfer assembly configured to move components to a work station in a work environment and a method for using a lift assist and transfer assembly to move a component.

Figure 1:
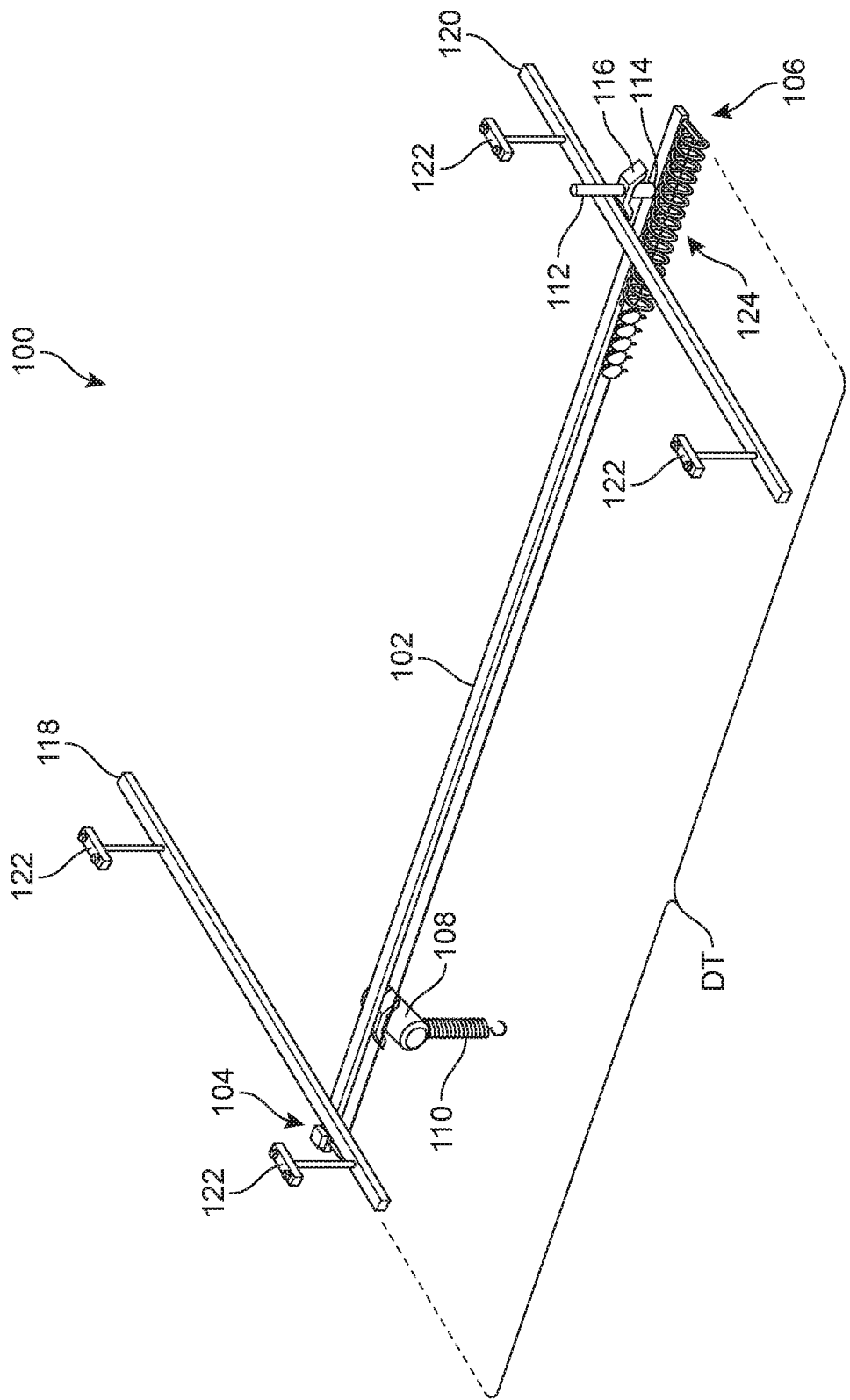
FIG. 1 is an isometric view of an example embodiment of a lift assist and transfer assembly.

FIG. 1 illustrates an isometric view of an example embodiment of a lift assist and transfer assembly 100. In some embodiments, lift assist and transfer assembly 100 (also referred to herein as "lift assembly") is configured for lifting and moving a part or component in a work environment, such as a factory, manufacturing facility, warehouse, or other location where assistance moving items may be useful.

As shown in FIG. 1, lift assembly 100 includes an overhead rail 102 that is mounted to a ceiling of the work environment. Overhead rail 102 has a first end 104 and a second end 106 disposed opposite first end 104. In an example embodiment, first end 104 of overhead rail 102 corresponds to a loading area in the work environment (i.e., the area where parts or components may be loaded or connected to lift assembly 100). Second end 106 of overhead rail 102 corresponds to a work area in the work environment (i.e., the area where the parts or components loaded onto lift assembly 100 are to be moved). In some embodiments, the work area may be a work station or multiple work stations where the parts or components are combined with other parts or components as part of an assembly or manufacturing process.

In an example embodiment, a travel distance DT is defined as the distance between the loading area and the work area. That is, travel distance DT is the distance within the work environment that lift assembly 100 is configured to move a part or component. In an example embodiment, movement along overhead rail 102 may be provided using a carriage 108. Carriage 108 is slidably attached to overhead rail 102 and is configured to support or hold the part or component to be moved. With this arrangement, carriage 108 slides along overhead rail 102 between first end 104 and second end 106 to move a part or component through travel distance DT from the loading area to the work area.

As shown in FIG. 1, carriage 108 includes an adjustable cable 110 that attaches or connects to the part or component, for example, using a hook, clip, clamp, magnet, or other type of mechanism that is configured to connect the part or component to adjustable cable 110. Adjustable cable 110 may be a cable, chain, strap, or other type of element that has sufficient tensile strength to support the weight of the part or component attached to carriage 108 via adjustable cable 110.

Additionally, in some embodiments, carriage 108 may include a motor or winch that is configured to change the length of adjustable cable 110 so as to adjust the height of an attached part or component relative to a floor or other surface of the work environment. In an example embodiment, adjustable cable 110 may include a spring or coil that is configured to bias adjustable cable 110 upwards at a certain distance from the floor or surface to assist an operator or worker with reaching for adjustable cable 110 when attaching a part or component to carriage 108.

In an example embodiment, lift assembly 100 also includes a pneumatic cylinder element 112. In this embodiment, pneumatic cylinder element 112 is disposed at second end 106 of overhead rail 102. Pneumatic cylinder element 112 has a lower attachment point 114 in contact with overhead rail 102 at or near second end 106 and an upper attachment point 116 on an overhead fixture of the ceiling. Pneumatic cylinder element 112 includes a cylinder that is biased into a retracted position and is configured to extend out to an extended position upon actuation. In the extended position, the cylinder of pneumatic cylinder element 112 pushes on overhead rail 102 at lower attachment point 114 at or near second end 106, thereby moving second end 106 of overhead rail 102 downward towards the floor or surface of the work environment.

When pneumatic cylinder element 112 pushes overhead rail 102 downward at or near second end 106, carriage 108 slides along overhead rail 102 from first end 104 (i.e., at the loading area of the work environment) to second end 106 (i.e., at the work area of the work environment) via gravitational force. That is, actuation of pneumatic cylinder element 112 at or near second end 106 of overhead rail 102 displaces second end 106 of overhead rail 106 downward such that overhead rail 102 has a downward slope in a direction of second end 106. Carriage 108 is configured to slide along overhead rail 102 by gravitational force due to the displaced second end 106 of overhead rail 102 when pneumatic cylinder element 112 is in the extended position.

In some embodiments, lift assembly 100 may include a biasing member 124 attached to carriage 108 to bias carriage 108 toward first end 104 of overhead rail 102 in a resting position. For example, biasing member 124 may include a coil or spring at second end 106 of overhead rail 102 that acts to bias carriage 108 toward first end 104. In some embodiments, biasing member 124 may also be configured to absorb momentum of carriage 108 with the attached part or component so that carriage 108 may be slowed or stopped when carriage 108 reaches second end 106 of overhead rail 102 to deliver the part or component to the work area of the work environment.

As described above, in some embodiments, overhead rail 102 of lift assembly 100 is mounted to the ceiling of the work environment, for example, by an overhead fixture of the ceiling. In one embodiment, the overhead fixture is one or more support beams that extend approximately transverse to overhead rail 102. For example, as shown in FIG. 1, a first support beam 118 is located at first end 104 of overhead rail 102 to mount one end of overhead rail 102 to the ceiling of the work environment and a second support beam 120 is located at second end 106 of overhead rail 102 to mount the other end of overhead rail 102 to the ceiling of the work environment.

Overhead fixtures, including first support beam 118 and/or second support beam 120, may use any suitable attachment or connection mechanism to mount the overhead fixtures to the ceiling. For example, in an example embodiment, first support beam 118 and/or second support beam 120 may be mounted to the ceiling using a plurality of mounts 122. Plurality of mounts 122 are hangars or brackets that attach to the ceiling at one end and the overhead fixture (e.g., first support beam 118 and/or second support beam 120) at the other end. Additionally, in some embodiments, plurality of mounts 122 may include rods or other elements that provide separation or space between the ceiling and the overhead fixture. With this arrangement, the height of overhead rail 102 of lift assembly 100 may be adjusted or configured for a particular work environment.

Figure 2:
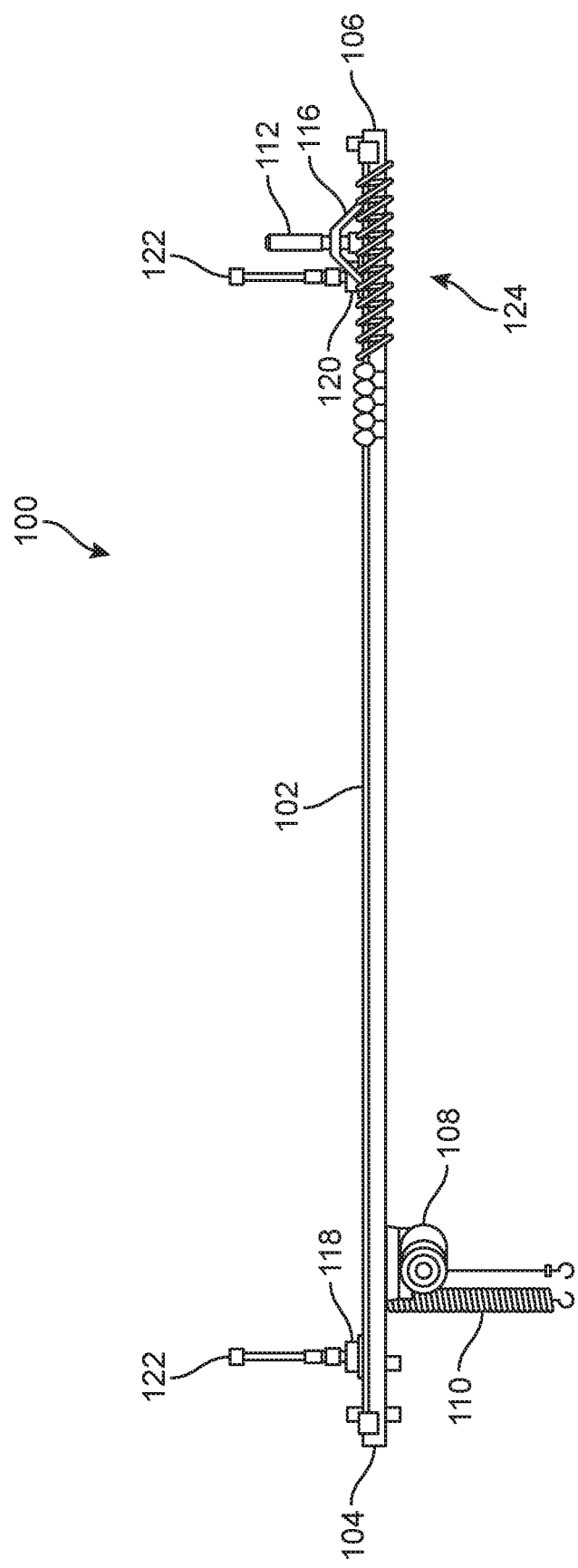
FIG. 2 is a side view of an example embodiment of the assembly of FIG. 1.

FIG. 2 is a side view of the example embodiment of lift assembly 100 of FIG. 1. As shown in this embodiment, plurality of mounts 122 attach first support beam 118 and second support beam 120 to the ceiling of the work environment and suspend overhead rail 102 of lift assembly 100 over the floor or surface of the work environment. Carriage 108 is slidably connected to overhead rail 102 and includes adjustable cable 110 for attaching or connecting to the part or component that is to be moved using lift assembly 100. As shown in FIG. 2, adjustable cable 110 of carriage 108 extends downward from carriage 108 on overhead rail 102 towards the floor or surface of the work environment. As described above, adjustable cable 110 may be raised or lowered so as to adjust the length of adjustable cable 110 and, thereby, the distance from the floor or surface of the work environment to assist operators or workers with loading the parts or components onto lift assembly 100 at the loading area and removing the parts or components off of lift assembly 100 at the work area.

Figure 3:
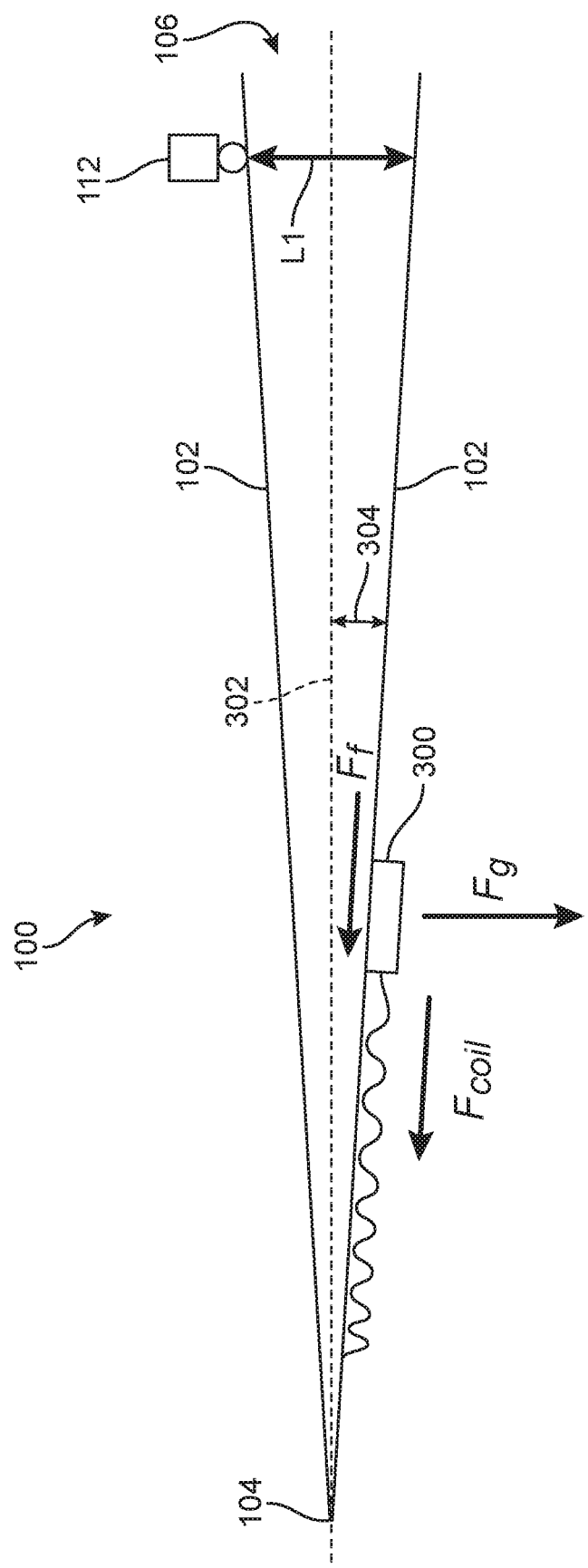
FIG. 3 is a schematic side view of an example embodiment of a lift assist and transfer assembly.

FIG. 3 is a schematic side view of an example embodiment of lift assist and transfer assembly 100. In this embodiment, a sum of the various forces involved in moving carriage 108 holding a part or component through travel distance DT between first end 104 and second end 106 of overhead rail 102 is shown. In this embodiment, the resistive forces include a frictional force ($F_f$), which is a function of the combined weight of carriage 108 and the part or component that is being moved by carriage 108, and a coil force ($F_{coil}$), which is the return or biasing force of biasing member 124 attached to carriage 108.

For example, as shown in FIG. 3, a mass 300 is representation of the combined weights of carriage 108 and a part or component being moved by carriage 108. The weight of carriage 108 is known and does not vary once connected to overhead rail 102 of lift assembly 100. The weight of parts or components to be moved by carriage 108, however, may vary, as different parts or components can have varying sizes and weights, depending on the particular part or component to be moved.

Accordingly, calculating the frictional force ($F_f$) for mass 300 includes determining a weight of a selected component (i.e., the part or component to be moved by carriage 108). The other resistive force, coil force ($F_{coil}$), has a known value for the biasing force of biasing member 124. For example, in an example embodiment, the value for the biasing force of biasing member 124 (i.e., coil force ($F_{coil}$)) may be approximately 5 Newtons (5N). It should be understood that the biasing force of biasing member 124 may be larger or smaller than 5N. For example, in some cases, the biasing force may be a function of the travel distance (DT) and/or the unloaded weight of carriage 108 for a particular implementation of lift assembly 100.

In an example embodiment, a cylinder stroke length (L1) is calculated for pneumatic cylinder element 112 based on the travel distance (DT) between a loading area where the selected component is attached to carriage 108 at first end 104 (or lift end) of overhead rail 102 of lift assembly 100 and a work area, such as a work station, where a component is to arrive at second end 106 (or work end) of overhead rail 102 of lift assembly 100. In some embodiments, the travel distance (DT) between first end 104 and second end 106 of overhead rail 102 of lift assembly 100 is a fixed distance that does not vary. Thus, for the purposes of calculating the cylinder stroke length (L1), the travel distance (DT) will be the same for each part or component that is to be moved.

The cylinder stroke length (L1) will vary, however, as a function of the determined weight of the selected component to be moved. In addition, in some embodiments, the cylinder stroke length (L1) is further calculated based on a target speed of carriage 108 moving through the travel distance (DT). Thus, depending on the desired target speed of mass 300 (i.e., carriage 108 holding the selected component) through the travel distance (DT), a value for the cylinder stroke length (L1) of pneumatic cylinder element 112 may be calculated. For example, in some embodiments, the target speed of mass 300 may be determined based on a threshold value. The threshold value may be a maximum speed at which parts or components are not to exceed within the work environment.

The calculated cylinder stroke length (L1) is the amount or distance in the vertical direction that second end 106 of overhead rail 102 is displaced when pneumatic cylinder element 112 is in the extended position when actuated. This displacement of second end 106 of overhead rail 102 in the vertical direction, while overhead rail 102 remains fixedly attached at first end 104, causes second end 106 of overhead rail 102 to move downward in the vertical direction upon actuation of pneumatic cylinder element 112 to the extended position, such that overhead rail 102 has a downward slope in a direction of second end 106.

As shown in FIG. 3, upon actuation of pneumatic cylinder element 112 by cylinder stroke length (L1), overhead rail 102 has a slope 304 below a horizontal axis 302. With this arrangement, mass 300 (i.e., carriage 108 holding the selected component) may slide along overhead rail 102 through the travel distance (DT) by gravitational force due to slope 304 caused by displaced second end 106 of overhead rail 102.

For example, in one embodiment, lift assembly 100 has a travel distance (DT) between first end 104 and second end 106 of overhead rail 102 of approximately 4.7 meters. Assuming a fixed weight for carriage 108 of approximately 23 kilograms and a weight of a selected component of approximately 25 kilograms, a target speed of approximately 1.175 meters per second may be determined for moving the selected component through the target distance (DT). Based on these exemplary values, the calculated cylinder stroke length (L1) value for pneumatic cylinder element 112 in this example is 0.1585 meters (approximately 6.24 inches). That is, the extended position of pneumatic cylinder element 112 is configured to displace second end 106 of overhead rail 102 by 0.1585 meters in the vertical direction so that carriage 108 holding the selected component will slide along overhead rail 102 through the travel distance (DT) from first end 104 and second end 106 by gravitational force due to the slope caused by the vertical displacement of second end 106 of overhead rail 102.

Figure 4:
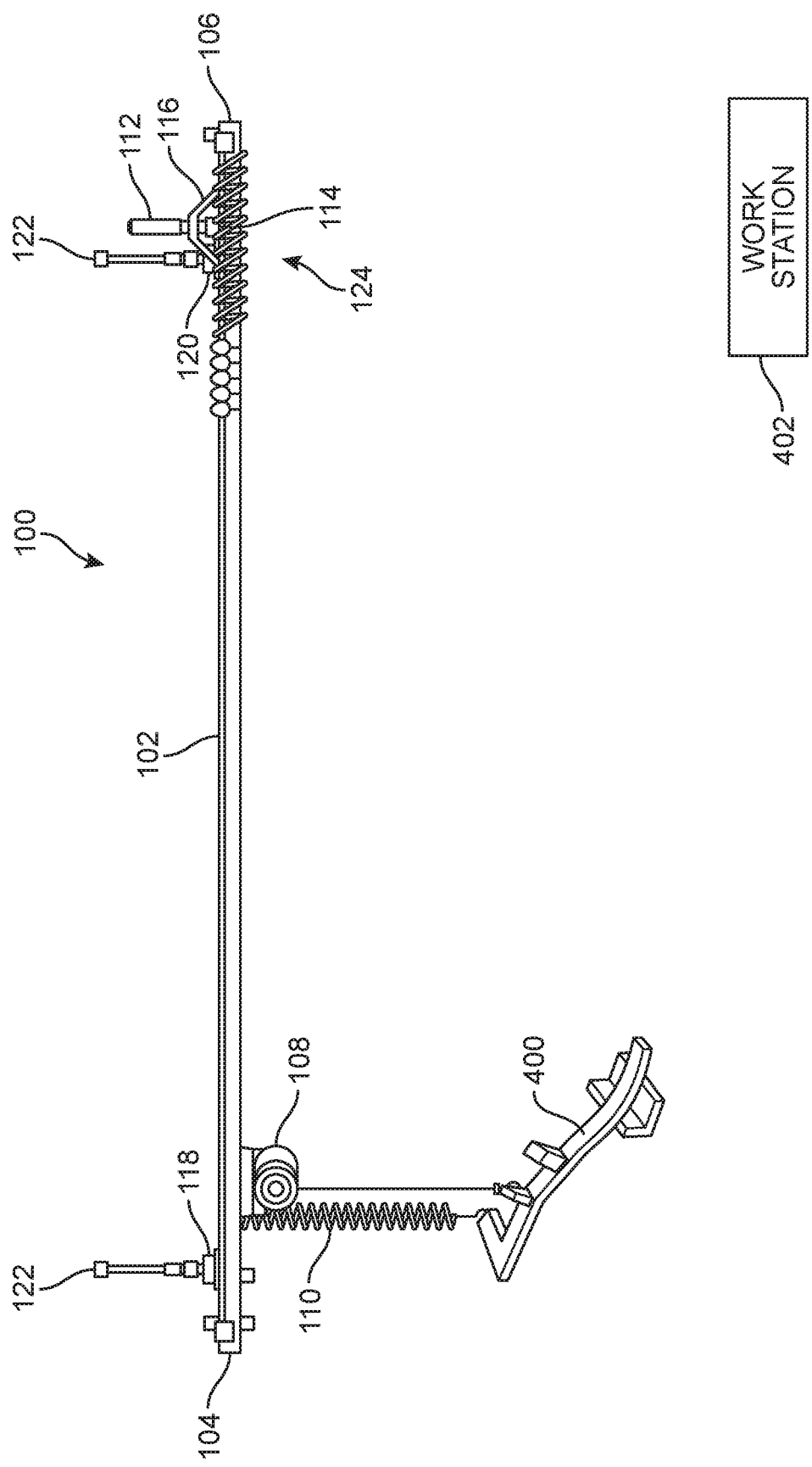
FIG. 4 is a representative view of an example embodiment of a lift assist and transfer assembly used to move a component to a work station.
Figure 5:
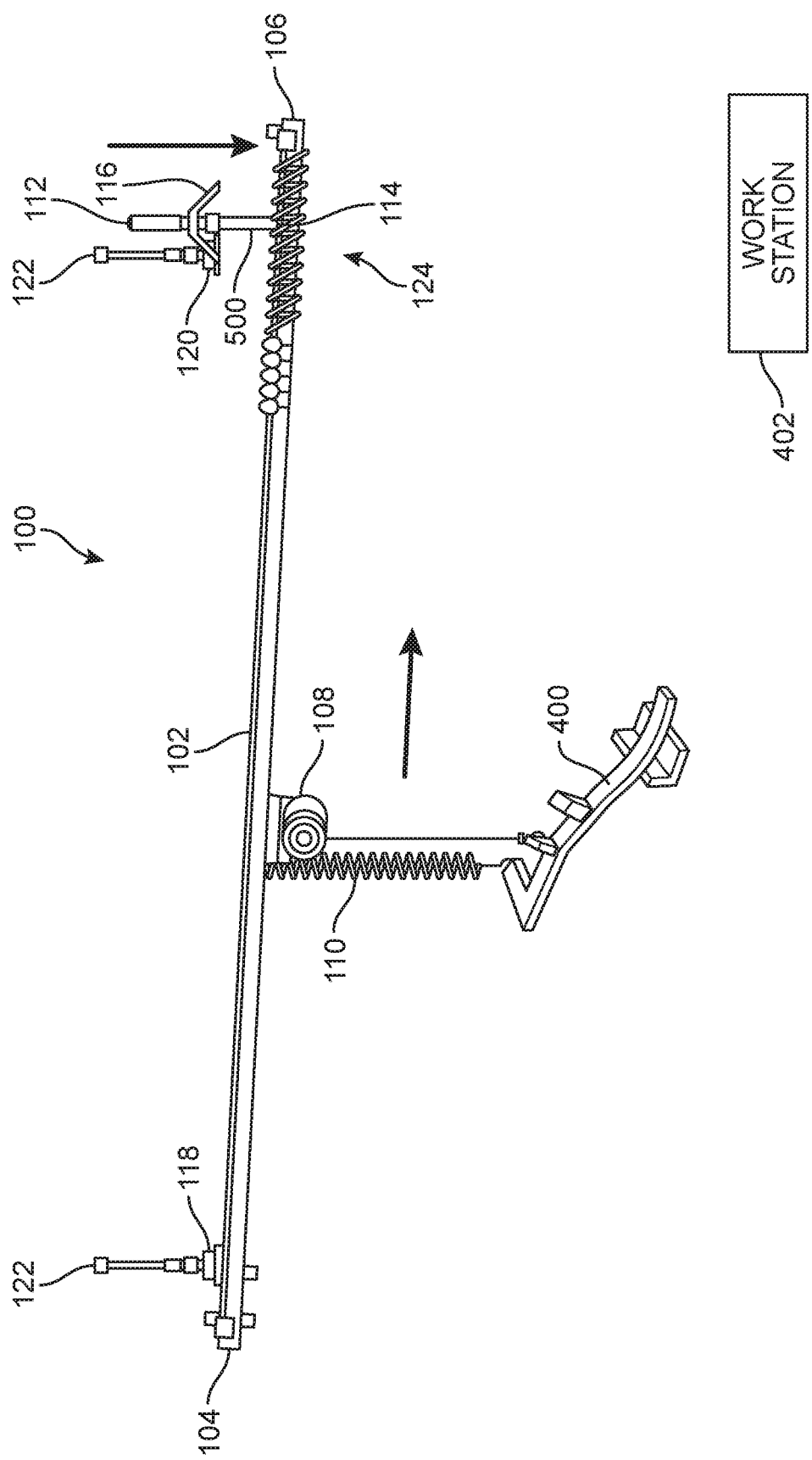
FIG. 5 is a representative view of an example embodiment of the assembly in the process of moving a component to a work station.
Figure 6:
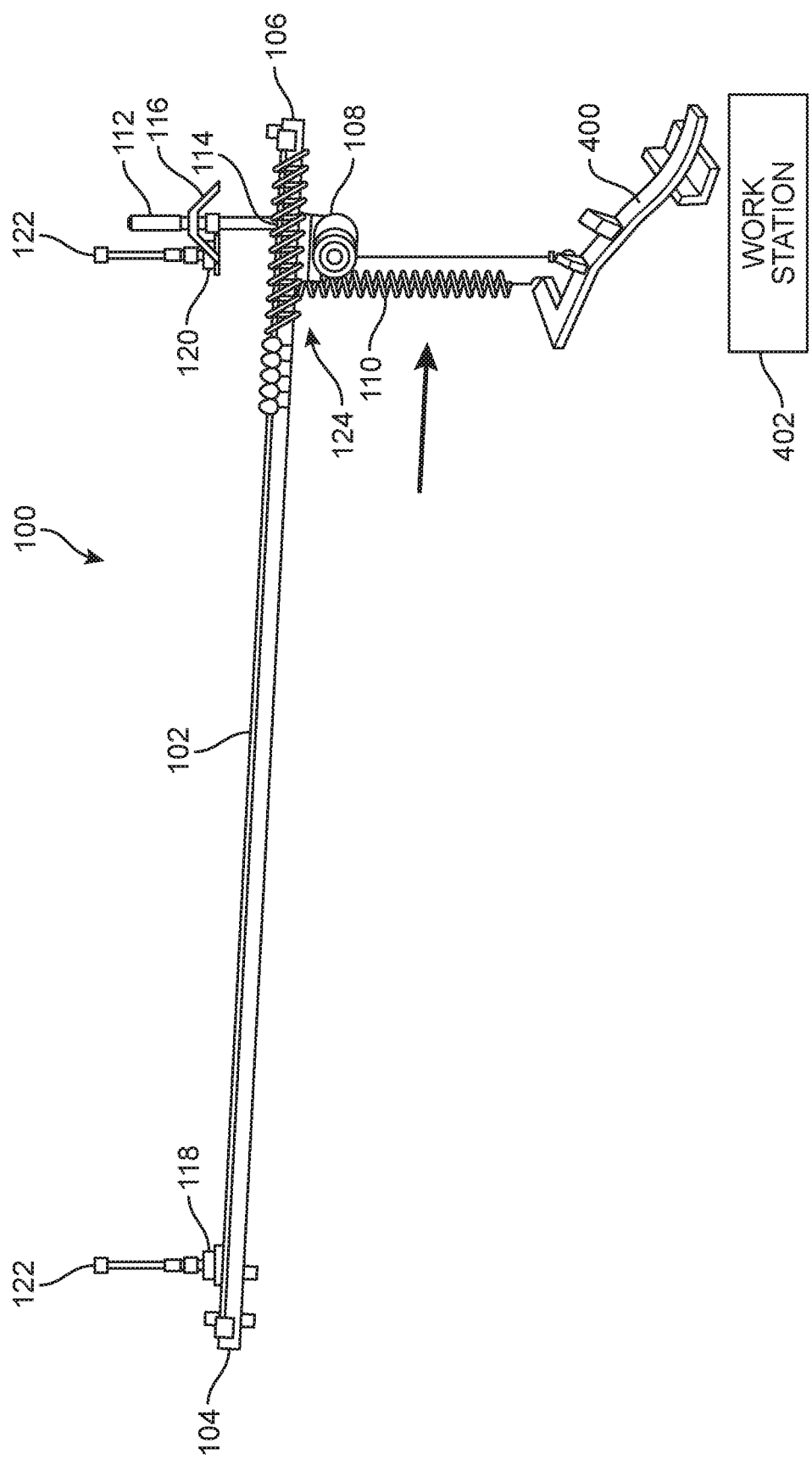
FIG. 6 is a representative view of an example embodiment of the assembly moving a component to a work station.

Referring now to FIGS. 4 through 6, an example embodiment of a process of lift assembly 100 moving a component to a work station in a work environment is shown. FIG. 4 is a representative view of an example embodiment of lift assist and transfer assembly 100 used to move a component 400 to a work station 402. In this embodiment, component 400 may be loaded onto overhead rail 102 of lift assembly 100 at first end 104 (i.e., the lift end) at a loading area of the work environment. As described above, component 400 is attached to adjustable cable 110 of carriage 108 to connect component 400 to be moved using lift assembly 100.

As shown in FIG. 4, component 400 is to be moved through the travel distance (DT) between the loading area at first end 104 of overhead rail 102 and work station 402 at second end 106 of overhead rail 102 using lift assembly 100.

In this embodiment, pneumatic cylinder element 112 is biased into a retracted position. That is, in the retracted position, overhead rail 102 is approximately horizontal, with first end 104 and second end 106 being substantially level with each other. In other words, with pneumatic cylinder element 112 in the retracted position, overhead rail 102 has approximately zero slope.

FIG. 5 is a representative view of an example embodiment of lift assembly 100 in the process of moving component 400 to work station 402. In this embodiment, pneumatic cylinder element 112 has been actuated from the retracted position to the extended position. Upon actuation of pneumatic cylinder element 112 to the extended position, second end 106 of overhead rail 102 is displaced in the vertical direction, while overhead rail 102 remains fixedly attached at first end 104 to first support beam 118.

As shown in FIG. 5, cylinder 500 of pneumatic cylinder element 112 causes second end 106 of overhead rail 102 to move downward in the vertical direction upon actuation of pneumatic cylinder element 112 to the extended position, such that overhead rail 102 has a downward slope in a direction of second end 106. As described above, cylinder 500 may displace second end 106 of overhead rail 102 in an amount or distance equal to the calculated cylinder stroke length (L1) of the pneumatic cylinder element 112, which may be based the travel distance (DT), the weight of component 400, and/or a target speed that component 400 is to move through the work environment. With this arrangement, carriage 108 holding component 400 slides along overhead rail 102 towards work station 402 by gravitational force due to the slope caused by the displaced second end 106 of overhead rail 102.

FIG. 6 is a representative view of an example embodiment of lift assembly 100 moving component 400 to work station 402. As shown in FIG. 6, component 400 has been moved from first end 104 of overhead rail 102 to second end 106 to deliver component 400 to work station 402. Using the techniques of the example embodiments described above, carriage 108 holding component 400 has moved along overhead rail 102 to work station 402 by gravitational force due to the slope caused by the displaced second end 106 of overhead rail 102 which has been moved by cylinder 500 of pneumatic cylinder element 112 being actuated to the extend position.

In some embodiments, biasing member 124 may slow or stop carriage 108 holding component 400 when carriage 108 reaches second end 106 of overhead rail 102. For example, biasing member 124 may absorb the momentum of carriage 108 with the attached component 400 so that carriage 108 may be slowed or stopped when carriage 108 reaches second end 106 of overhead rail 102 to deliver component 400 to work station 402 in the work environment. In addition, in some embodiments, biasing member 124 may also return carriage 108 to first end 104 of overhead rail 102 upon removal of component 400 from carriage 108 and upon return of cylinder 500 of pneumatic cylinder element 112 to the retracted position. With this arrangement, once component 400 is removed from carriage 108 and the slope of overhead rail 102 returns to approximately zero (i.e., with pneumatic cylinder element 112 in the retracted position), the biasing force of biasing member 124 (i.e., coil force ($F_{coil}$), described above) acts to move carriage 108 back to first end 104 of overhead rail 102, where another component may be loaded and moved.

Figure 7:
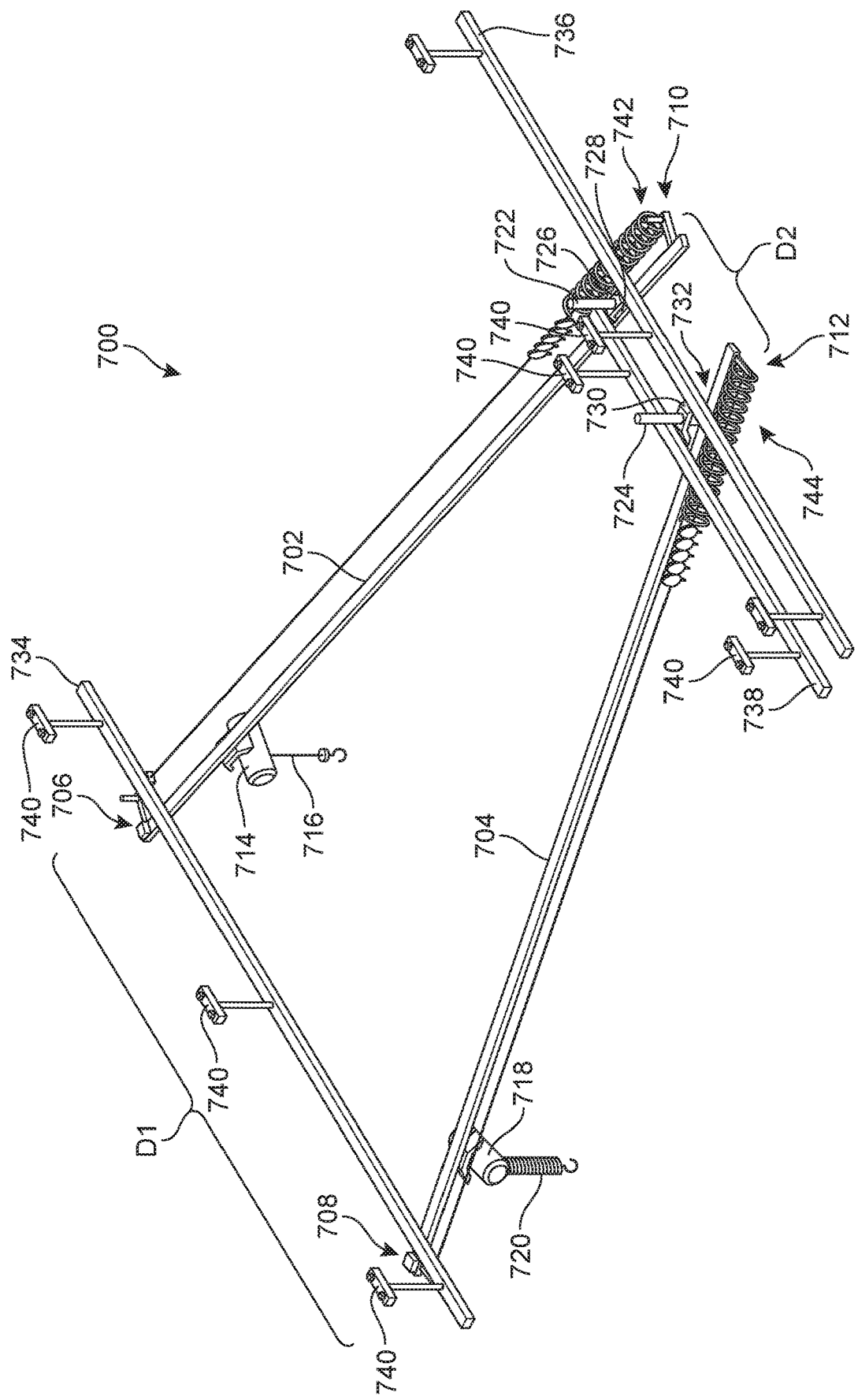
FIG. 7 is an isometric view of an example embodiment of a lift assist and transfer assembly including two overhead rails.

The previous embodiments have been described in reference to a lift assembly including one overhead rail, for example, lift assembly 100, described above. In other embodiments, a lift assembly may include multiple overhead rails. With this arrangement, a lift assembly with multiple overhead rails may be configured to move multiple parts or components to a desired location within a work environment. FIG. 7 is an isometric view of an example embodiment of a lift assist and transfer assembly 700 including two overhead rails.

In an example embodiment, lift assembly 700 includes a first overhead rail 702 and a second overhead rail 704 mounted to a ceiling of the work environment. Each of first overhead rail 702 and second overhead rail 704 has a similar configuration as overhead rail 102, described above. In this embodiment, first overhead rail 702 has a first end 706 and a second end 710 disposed opposite first end 706 and second overhead rail 704 has a first end 708 and a second end 712 disposed opposite first end 708.

In an example embodiment, first end 706 of first overhead rail 702 and first end 708 of second overhead rail 704 correspond to a loading area in the work environment (i.e., the area where parts or components may be loaded or connected to lift assembly 700). In some cases, first end 706 and first end 708 may also be referred to as the lift ends, respectively, of first overhead rail 702 and second overhead rail 704. In an example embodiment, lift end 706 of first overhead rail 702 and lift end 708 of second overhead rail 704 are spaced apart by a first distance D1.

Second end 710 of first overhead rail 702 and second end 712 of second overhead rail 704 correspond to a work area in the work environment (i.e., the area where the parts or components loaded onto lift assembly 700 are to be moved). In some cases, second end 710 and second end 712 may also be referred to as the work ends, respectively, of first overhead rail 702 and second overhead rail 704. In an example embodiment, work end 710 of first overhead rail 702 and work end 712 of second overhead rail 704 are spaced apart by a second distance D2. In this embodiment, second distance D2 is smaller than first distance D1. That is, in this embodiment, first overhead rail 702 and second overhead rail 704 are not parallel with each other. With this arrangement, first overhead rail 702 and second overhead rail 704 define an approximately trapezoidal shape of lift assembly 700.

In some embodiments, the work area may be a work station or multiple work stations where the parts or components are combined with other parts or components as part of an assembly or manufacturing process. The configuration of lift assembly 700 with the work ends of first overhead rail 702 and second overhead rail 704 being located closer together than the lift ends allows parts or components to be spaced farther apart at the loading area and to converge at the work area, where the parts or components are to be assembled together at a work station.

In an example embodiment, movement along each of first overhead rail 702 and second overhead rail 704 may be provided using a carriage having a substantially similar configuration as carriage 108, described above. In this embodiment, a first carriage 714 is slidably attached to first overhead rail 702 and a second carriage 718 is slidably attached to second overhead rail 704. First carriage 714 and second carriage 718 are each configured to support or hold a part or component to be moved. With this arrangement, first carriage 714 slides along first overhead rail 702 between lift end 706 and work end 710 to move a first part or component through a travel distance from the loading area to the work area and second carriage 718 slides along second overhead rail 704 between lift end 708 and work end 712 to move a second part or component through the travel distance from the loading area to the work area.

As shown in FIG. 7, each carriage includes an adjustable cable that attaches or connects to the part or component, as described above. For example, in this embodiment, first carriage 714 includes a first adjustable cable 716 and second carriage 718 includes a second adjustable cable 720. Additionally, in some embodiments, first carriage 714 and/or second carriage 718 may include a motor or winch that is configured to change the length of the respective adjustable cable (e.g., first adjustable cable 716 and second adjustable cable 720) so as to adjust the height of an attached part or component relative to a floor or other surface of the work environment. In an example embodiment, first adjustable cable 716 and/or second adjustable cable 720 may include a spring or coil that is configured to bias each adjustable cable upwards at a certain distance from the floor or surface to assist an operator or worker with reaching for the adjustable cable when attaching a part or component to the carriage.

In an example embodiment, lift assembly 700 also includes a pneumatic cylinder element for each overhead rail. In this embodiment, a first pneumatic cylinder element 722 is disposed at work end 710 of first overhead rail 702 and a second pneumatic cylinder element 724 is disposed at work end 712 of second overhead rail 704. Each pneumatic cylinder element is attached to an overhead fixture of the ceiling and contacts the overhead rail at or near the work end.

As shown in FIG. 7, first pneumatic cylinder element 722 has an upper attachment point 726 on an overhead fixture of the ceiling and has a lower attachment point 728 in contact with first overhead rail 702 at or near work end 710. Similarly, second pneumatic cylinder element 724 has an upper attachment point 730 on an overhead fixture of the ceiling and has a lower attachment point 732 in contact with second overhead rail 704 at or near work end 712. Each pneumatic cylinder element (e.g., first pneumatic cylinder element 722 and second pneumatic cylinder element 724) includes a cylinder that is biased into a retracted position and is configured to extend out to an extended position upon actuation. In the extended position, the cylinder of each pneumatic cylinder element pushes on its respective overhead rail at the lower attachment point at or near the work end of the rail, thereby moving the work end of the respective overhead rail downward towards the floor or surface of the work environment.

As described above, when each pneumatic cylinder element pushes the overhead rail downward at or near the work end of the rail, the carriage attached to the overhead rail slides along the rail from the lift end or first end (i.e., at the loading area of the work environment) to the work end or second end (i.e., at the work area of the work environment) via gravitational force. For example, as shown in FIG. 7, first pneumatic cylinder element 722 moves work end 710 of first overhead rail 702 downward to cause first carriage 714 to slide along first overhead rail 702 and second pneumatic cylinder element 724 moves work end 712 of second overhead rail 704 downward to cause second carriage 718 to slide along second overhead rail 704.

That is, actuation of a respective pneumatic cylinder element 722, 724 at or near work end 710, 712 of each overhead rail 702, 704 displaces work end 710, 712 of overhead rail 702, 704 downward such that the overhead rail 702, 704 has a downward slope in a direction of work end 710, 712. Each respective carriage 714, 718 is configured to slide along overhead rail 702, 704 by gravitational force due to the displaced work end 710, 712 of overhead rail 702, 704 when the respective pneumatic cylinder element 722, 724 is in the extended position. Additionally, in this embodiment, each of first pneumatic cylinder element 722 and second pneumatic cylinder element 724 are independently actuated so that first carriage 714 may slide along first overhead rail 702 independently or at a different time than second carriage 718 slides along second overhead rail 704.

With this arrangement, an operator or worker using lift assembly 700 may load one component onto a carriage of one of first overhead rail 702 and second overhead rail 704 and may load another component onto a carriage of the other overhead rail while the first component is sliding down the overhead rail to the work area. Accordingly, lift assembly 700 of the present embodiments may increase manpower efficiency and reduce waiting or downtime for operators or workers within the work environment.

In some embodiments, lift assembly 700 may include biasing members attached to each carriage to bias the carriage towards the lift ends of the overhead rails in a resting position. For example, a first biasing member 742 may include a coil or spring at work end 710 of first overhead rail 702 that acts to bias first carriage 714 towards lift end 706 and a second biasing member 744 may include a coil or spring at work end 712 of second overhead rail 704 that acts to bias second carriage 718 towards lift end 708. As described above, in some embodiments, biasing members 742, 744 may also be configured to absorb momentum of carriage 714, 718 holding the attached part or component so that carriage 714, 718 may be slowed or stopped when it reaches the work end 710, 712 of overhead rail 702, 704 to deliver the part or component to the work area of the work environment.

As described above, in some embodiments, first overhead rail 702 and second overhead rail 704 of lift assembly 700 are mounted to the ceiling of the work environment, for example, by an overhead fixture of the ceiling. In one embodiment, the overhead fixture is one or more support beams that extend approximately transverse to overhead rails 702, 704. For example, as shown in FIG. 7, a first support beam 734 is located at lift end 706 of first overhead rail 702 to mount one end of first overhead rail 702 to the ceiling of the work environment. In this embodiment, first support beam 734 also mounts lift end 708 of second overhead rail 704 to the ceiling. A second support beam 736 is located at work end 710 of first overhead rail 702 to mount the other end of first overhead rail 702 to the ceiling of the work environment. Similarly, a third support beam 738 is located at work end 712 of second overhead rail 704 to mount the other end of second overhead rail 704 to the ceiling of the work environment.

Overhead fixtures, including first support beam 734, second support beam 736, and/or third support beam 738, may use any suitable attachment or connection mechanism to mount the overhead fixtures to the ceiling. For example, in an example embodiment, first support beam 734, second support beam 736, and/or third support beam 738 may be mounted to the ceiling using a plurality of mounts 740. Plurality of mounts 740 are substantially similar to plurality of mounts 122, described above.

Figure 8:
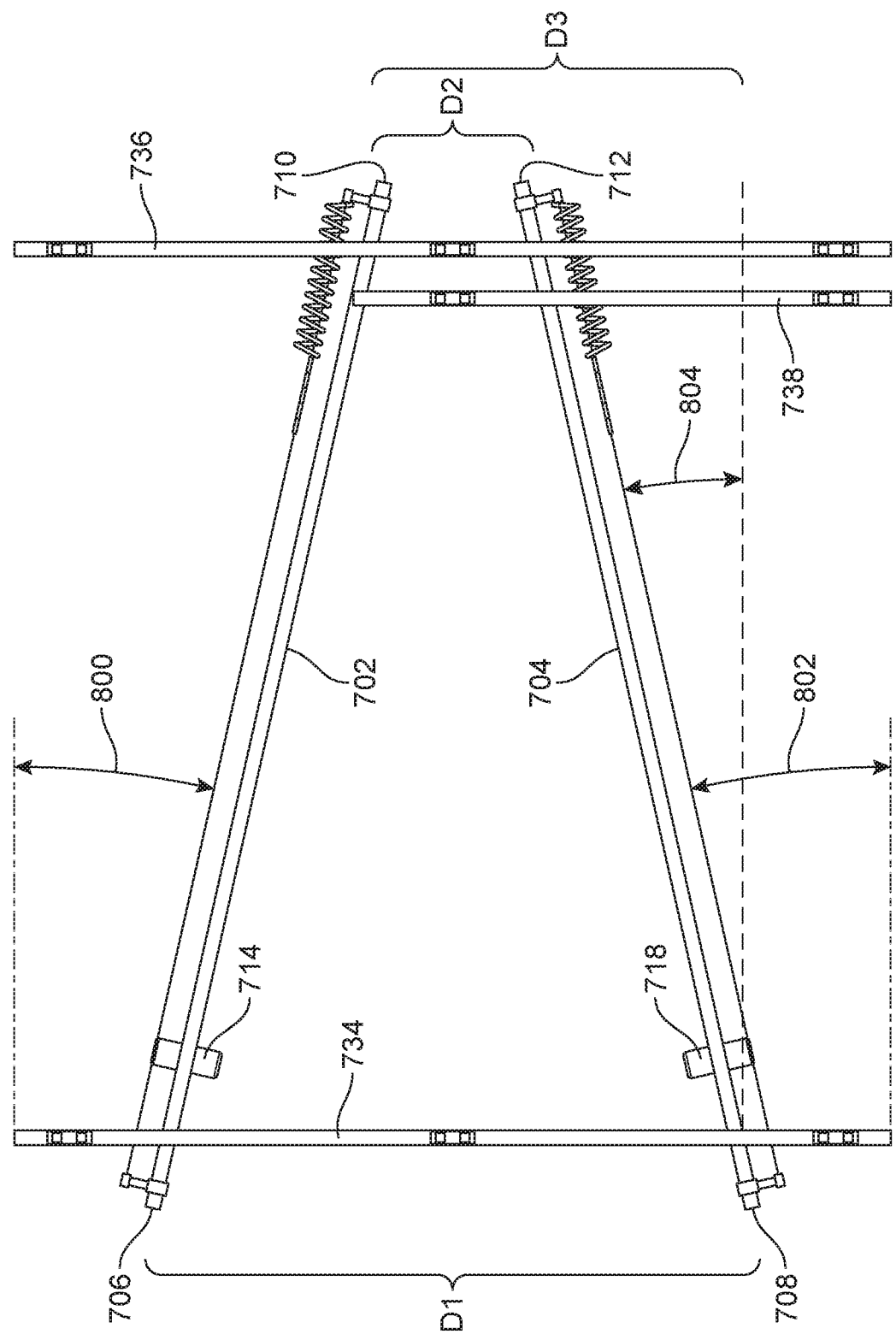
FIG. 8 is a top view of an example embodiment of the assembly including two overhead rails of FIG. 7.

Referring now to FIG. 8, a top view of the example embodiment of lift assembly 700 including first overhead rail 702 and second overhead rail 704 is shown. In this embodiment, lift end 706 of first overhead rail 702 and lift end 708 of second overhead rail 704 are spaced apart by first distance D1, while work end 710 of first overhead rail 702 and work end 712 of second overhead rail 704 are spaced apart by second distance D2 that is smaller than first distance D1. That is, in this embodiment, first overhead rail 702 and second overhead rail 704 are not parallel with each other. As shown in FIG. 8, first overhead rail 702 is at a first angle 800 and second overhead rail 704 is a second angle 802. In an example embodiment, first angle 800 and second angle 802 are approximately equal.

In some embodiments, at least one of first overhead rail 702 or second overhead rail 704 may be configured to move the location of its work end (e.g., work end 710 or work end 712) so as to change the angle of the overhead rail, thereby adjusting the separation distance between the work ends of first overhead rail 702 and second overhead rail 704. For example, in a first configuration of lift assembly 700, work end 710 of first overhead rail 702 and work end 712 of second overhead rail 704 are spaced apart by second distance D2. By adjusting second angle 802 of second overhead rail 704 by a third angle 804, work end 712 of second overhead rail 704 moves farther apart from work end 710 of first overhead rail 702. For example, second overhead rail 704 may be attached at or near lift end 708 to first support beam 734 via a pivot mechanism or motor that can be actuated to change the angle of second overhead rail 704.

Accordingly, in a second configuration of lift assembly 700, work end 710 of first overhead rail 702 and work end 712 of second overhead rail 704 are spaced apart by a third distance D3. In this embodiment, third distance D3 is larger than second distance D2 associated with the first configuration. It should be understood that a similar adjustment may also be made in the opposite direction to bring the work ends of the overhead rails closer.

With this configuration, in some embodiments, the separation distance between the work ends of the overhead rails of the lift assembly may be adjusted or changed so that parts or components moved to the work area may be spaced closer or farther apart from each other. For example, different parts or components may be assembled in different locations within a work station including lift assembly 700. By providing a mechanism to change the separation distance between the work ends of the overhead rails, parts or components may be more easily moved to the desired location at the work station of the work environment.

Figure 9:
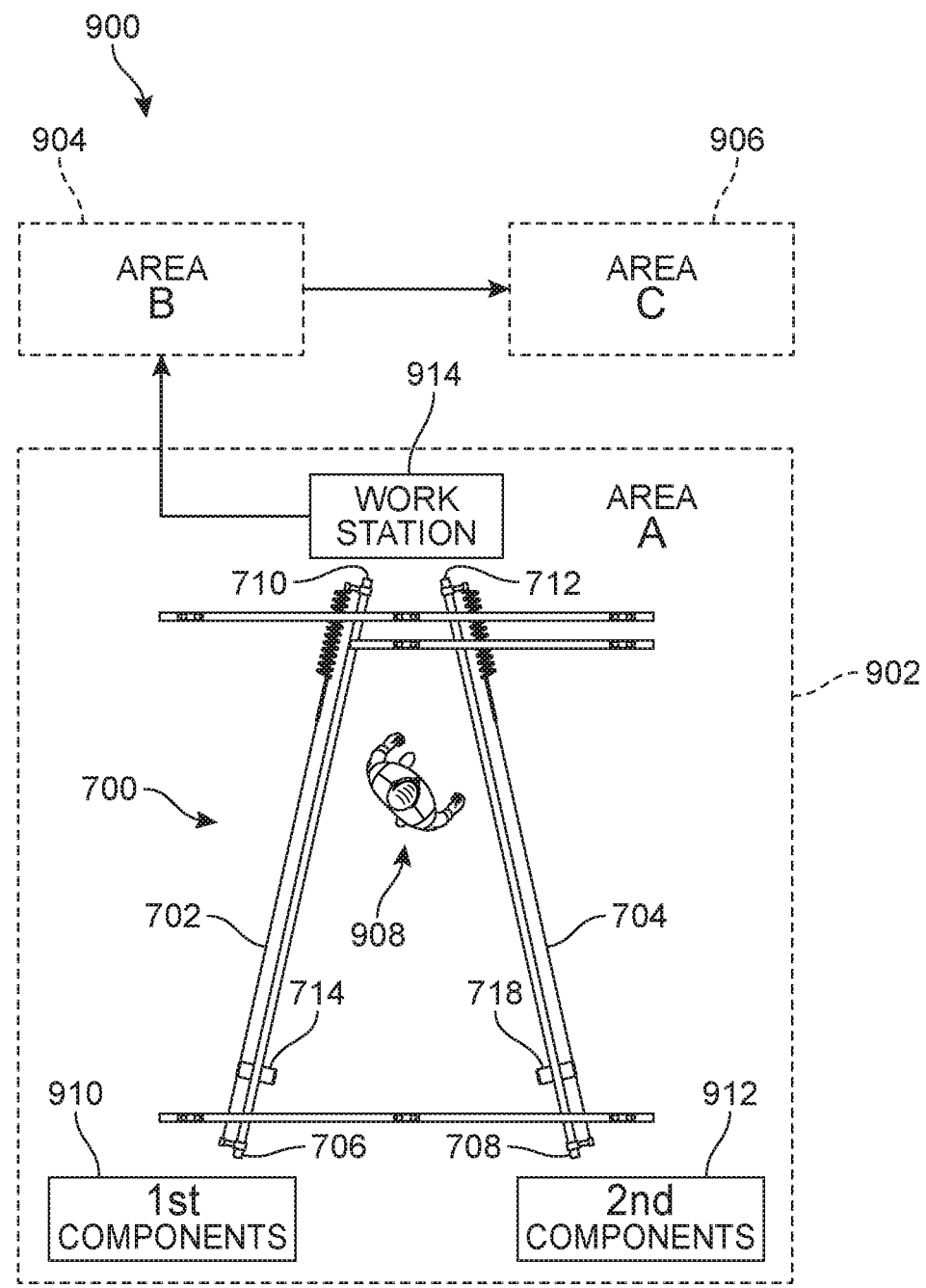
FIG. 9 is a representative view of an example embodiment of a lift assist and transfer assembly being used in a work environment.

FIG. 9 is a representative view of an example embodiment of lift assist and transfer assembly 700 being used in a work environment 900. Work environment 900 may be a factory, manufacturing facility, warehouse, or other location where assistance moving items may be useful. In an example embodiment, work environment 900 is a vehicle manufacturing facility. In some embodiments, work environment 900 may be a large space or building including multiple areas where different work stations are provided for various aspects or steps of assembly. Accordingly, work environment 900 may include one or more lift assemblies at various areas within work environment 900 to assist with moving parts or components between the areas and/or work stations within work environment 900.

For example, as shown in FIG. 9, work environment 900 includes a work area A 902, a work area B 904, and a work area C 906. Each work area in work environment 900 may be configured to assemble different parts or components of a finished product or item of manufacture. For example, in the example embodiment where work environment 900 is a vehicle manufacturing facility, each work area of work area A 902, work area B 904, and work area C 906 may be configured to assemble different portions of a vehicle. Accordingly, assistance moving the vehicle during the assembly process throughout the different work areas of work environment 900 may be provided by one or more lift assemblies according to the example embodiments described herein.

In this embodiment, work area A 902 includes lift assembly 700, as previously described. An operator 908 within work area A 902 may use lift assembly 700 to provide assistance with lifting and/or moving parts or components from one end of work area A 902 (i.e., the loading area) to the other end where the parts or components are attached or combined at a work station 914. In an example embodiment, the loading area of work area A 902 includes the components to be moved using lift assembly 700.

As shown in FIG. 9, a plurality of first components 910 may be provided on one side of lift assembly 700, for example, near lift end 706 of first overhead rail 702 of lift assembly 700, and a plurality of second components 912 may be provided on the other side of lift assembly 700, for example, near lift end 708 of second overhead rail 704 of lift assembly 700. With this configuration, lift assembly 700 may be used by operator 908 to load and move components from plurality of first components 910 using first carriage 714 sliding along first overhead rail 702 to work station 914 and also to load and move components from plurality of second components 912 using second carriage 718 sliding along second overhead rail 704 to work station 914.

In various embodiments, plurality of first components 910 and plurality of second components 912 may be similar or different components to be assembled or combined together at work station 914 of work area A 902. For example, in some cases, plurality of first components 910 and plurality of second components 912 may be similar components configured for opposite sides of the item being assembled at work station 914, such as driver-side and passenger-side components of a vehicle. In other cases, the components may be for different portions of an item being assembled, such as drivetrain components and suspension components of a vehicle.

In one embodiment, operator 908 may load a first component from plurality of first components 910 onto first carriage 714 of first overhead rail 702 at lift end 706 and control actuation of the pneumatic cylinder element (e.g., first pneumatic cylinder element 722, shown in FIG. 7) to move work end 710 of first overhead rail 702 downward to cause first carriage 714 to slide along first overhead rail 702 by gravitational force to work end 710 and deliver the first component to work station 914. Meanwhile, operator 908 can remain near the loading area of lift assembly 700 while first carriage 714 is sliding along first overhead rail 702.

Operator 908 may also load a second component from plurality of second components 912 onto second carriage 718 of second overhead rail 704 at lift end 708 and control actuation of the pneumatic cylinder element (e.g., second pneumatic cylinder element 724, shown in FIG. 7) to move work end 712 of second overhead rail 704 downward to cause second carriage 718 to slide along second overhead rail 704 by gravitational force to work end 712 and deliver the second component to work station 914. With this arrangement, one operator (e.g., operator 908) can move two components using lift assembly 700 to work station 914. Additionally, in contrast with conventional mechanisms, lift assembly 700 does not require operator 908 to guide or hold the components as they move along first overhead rail 702 and/or second overhead rail 704 from the loading area to work station 914. The lift assembly of the present embodiments can assist with improving and increasing worker efficiency and/or reducing the amount of distance that operators or workers need to travel to move parts or components within the work environment.

In this embodiment, lift assembly 700 is shown moving components to work station 914 within work area A 902. In some embodiments, a work environment (e.g., work environment 900) may include a plurality of lift assemblies located at one or more work areas within the work environment to assist with moving parts, components, and/or partially assembled items between the various work areas. For example, as shown in FIG. 9, once components from plurality of first components 910 and plurality of second components 912 are moved to work station 914 using lift assembly 700 and assembled or worked on within work area A 902, another lift assembly may be used to transfer the partially assembled item from work area A 902 to another work area within work environment 900, such as work area B 904 and/or work area C 906. Additionally, each other work area, for example, work area B 904 and/or work area C 906, may also include lift assemblies to assist with loading and/or moving components within those work areas.

Figure 10:
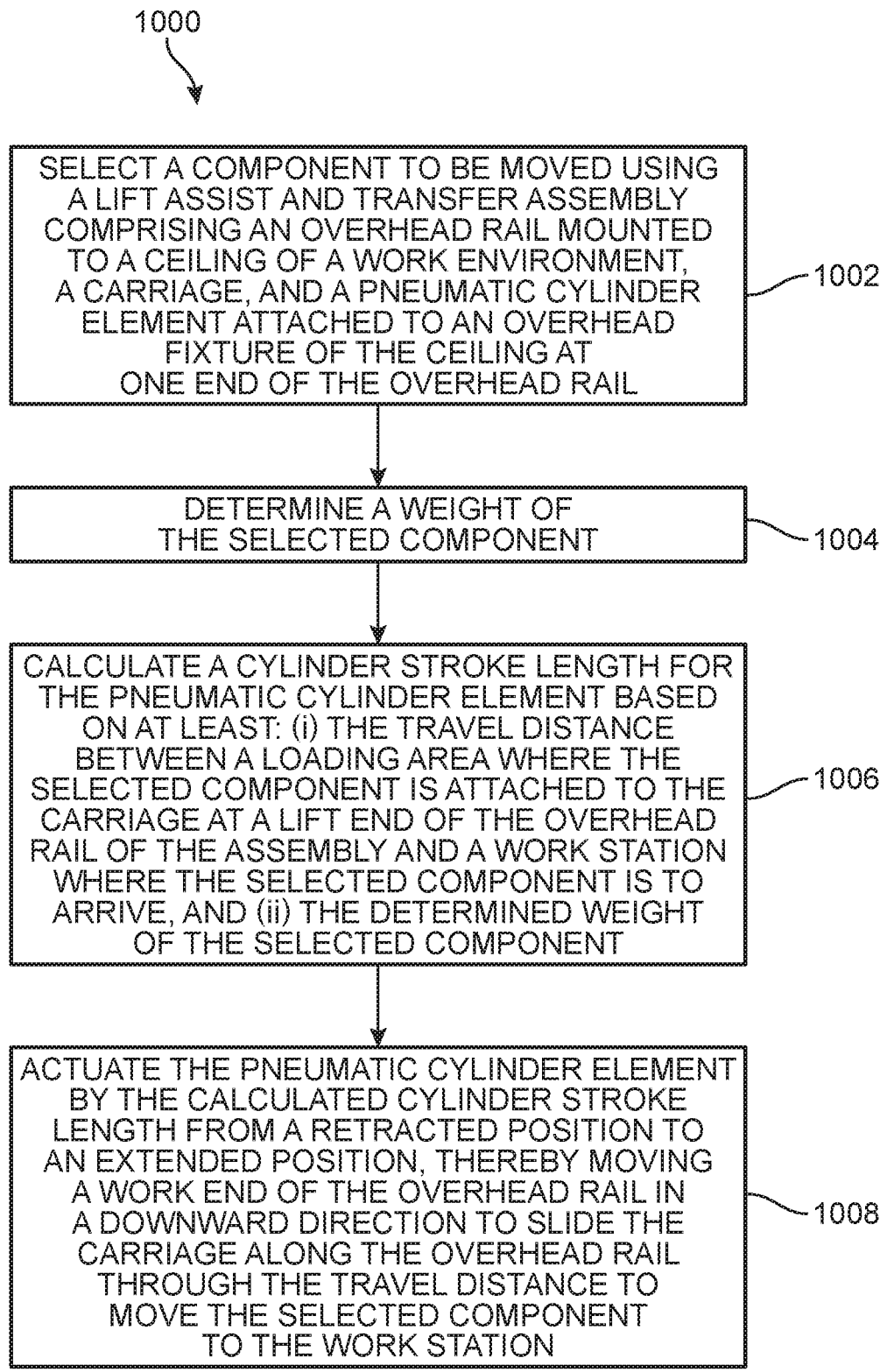
FIG. 10 is a flowchart of an example embodiment of a method for using a lift assist and transfer assembly to move a component.

FIG. 10 is a flowchart of an example embodiment of a method 1000 for using a lift assist and transfer assembly to move a component. Method 1000 will be described with reference to a lift assist and transfer assembly (e.g., lift assembly 100, described above), however, it should be understood that method 1000 may be implemented using any of the various embodiments of lift assemblies according to the principles described herein.

In this embodiment, method 1000 begins at an operation 1002, where a component to be moved using a lift assist and transfer assembly is selected. In this embodiment, the lift assembly includes at least an overhead rail mounted to a ceiling of a work environment, a carriage, and a pneumatic cylinder element attached to an overhead fixture of the ceiling at one end of the overhead rail.

Next, method 1000 includes an operation 1004, where a weight of the selected component is determined. The weight determined at operation 1004 may be predetermined based on a known value for the selected component or may be calculated using a scale or other mechanism. Method 1000 further includes an operation 1006. At operation 1006, a cylinder stroke length for the pneumatic cylinder element is calculated based on at least: (i) the travel distance between a loading area where the selected component is attached to the carriage at a lift end of the overhead rail of the assembly and a work station where the selected component is to arrive, and (ii) the determined weight of the selected component (e.g., from operation 1004).

Method 1000 also includes an operation 1008. At operation 1008, the pneumatic cylinder element is actuated by the calculated cylinder stroke length (e.g., from operation 1006) from a retracted position to an extended position. The actuation of the pneumatic cylinder element thereby moves a work end of the overhead rail in a downward direction to slide the carriage along the overhead rail through the travel distance to move the selected component to the work station. Once the component has reached the work station, it may be removed, as described above, and the carriage may return back to the loading area by action of a biasing member, as described above.

Method 1000 may iterated multiple times to move additional components to a work station using the lift assembly of the present embodiments. Additionally, in embodiments where a lift assembly with multiple overhead rails is provided, method 1000 may be implemented for each component to be moved with respect to each overhead rail of the lift assembly. With this configuration, method 1000 may allow a single operator or worker to move two or more components to the work station while remaining at the loading area.

The techniques of the example embodiments improve the process or method for loading parts or components to increase manpower efficiency. Additionally, the lift assembly according to the present embodiments can reduce waiting times, minimize walking distances, and eliminate repeated actions for operators or workers using the lift assembly. Also, because operation of the lift assembly according to the principles described above allows control over the travel speed of components sliding along the overhead rails of the lift assembly by adjusting the slope of the rail, threshold values for maximum speeds in a given work environment can be established.

While various embodiments have been described, the description is intended to be exemplary, rather than limiting and it will be apparent to those of ordinary skill in the art that many more embodiments and implementations are possible that are within the scope of the claims. Additionally, one or more of the various embodiments described above may be combined in part or in whole in accordance with the principles described herein. Accordingly, the embodiments are not to be restricted except in light of the attached claims and their equivalents. Also, various modifications and changes may be made within the scope of the attached claims.

What is claimed is:

1. A lift assist and transfer assembly for lifting and moving a component through a travel distance, the assembly comprising:
   an overhead rail mounted to a ceiling of a work environment, the overhead rail having a first end and a second end, corresponding to a loading area and a work area, respectively, defining the travel distance;
   a carriage slidably attached to the overhead rail for supporting the component thereon;
   a biasing member attached to the carriage to bias the carriage toward the first end in a resting position; and
   a pneumatic cylinder element disposed at the second end of the overhead rail and having a lower attachment point on the second end of the overhead rail and an upper attachment point on an overhead fixture of the ceiling, the pneumatic cylinder element being biased into a retracted position and configured to extend to an extended position upon actuation, thereby moving the second end of the overhead rail downward;
   wherein the carriage is configured to slide along the overhead rail from the first end to the second end upon actuation of the pneumatic cylinder element at the second end of the overhead rail to displace the second end of the overhead rail such that the overhead rail has a downward slope in a direction of the second end.

2. The assembly according to claim 1, wherein the carriage includes an adjustable cable configured to attach to the component.

3. The assembly according to claim 1, wherein a cylinder stroke length of the pneumatic cylinder element is calculated based at least on a weight of the component.

4. The assembly according to claim 3, wherein the cylinder stroke length is further calculated based on the travel distance.

5. The assembly according to claim 3, wherein the cylinder stroke length is further calculated based on a target speed of the carriage moving through the travel distance.

6. The assembly according to claim 5, wherein the target speed is based on a threshold value.

7. The assembly according to claim 1, further comprising:
a first support beam mounted to the ceiling of the work environment and attached to the overhead rail at the first end; and
a second support beam mounted to the ceiling of the work environment at the second end, wherein the pneumatic cylinder element is attached to the second support beam at the upper attachment point.

8. The assembly according to claim 7, wherein the overhead rail is fixedly attached to the first support beam at the first end; and
wherein the second end of the overhead rail is configured to move in a vertical direction by actuation of the pneumatic cylinder element to the extended position.

9. The assembly according to claim 1, wherein the carriage is configured to slide along the overhead rail by gravitational force due to the displaced second end of the overhead rail when the pneumatic cylinder element is in the extended position.

10. The assembly according to claim 1, further comprising:
at least one second overhead rail mounted to the ceiling of the work environment, the second overhead rail having a first end and a second end, corresponding to the loading area and the work area, respectively;
a second carriage slidably attached to the second overhead rail for supporting at least one second component thereon; and
a second pneumatic cylinder element disposed at the second end of the second overhead rail and having a lower attachment point on the second end of the second overhead rail and an upper attachment point on an overhead fixture of the ceiling, the second pneumatic cylinder element being biased into a retracted position and configured to extend to an extended position upon actuation, thereby moving the second end of the second overhead rail downward; and
wherein the second carriage is configured to slide along the second overhead rail from the first end to the second end upon actuation of the second pneumatic cylinder element at the second end of the second overhead rail to displace the second end of the second overhead rail such that the second overhead rail has a downward slope in a direction of the second end.

11. A lift assist and transfer assembly for lifting and moving components through a travel distance, the assembly comprising:
at least two overhead rails mounted to a ceiling of a work environment, each overhead rail having a lift end and a work end, corresponding to a loading area and a work area, respectively, defining the travel distance, wherein the at least two overhead rails are spaced apart by a first distance at the lift ends and the at least two overhead rails are spaced apart by a second distance at the work ends, the second distance is smaller than the first distance;
a carriage slidably attached to each overhead rail; and
a pneumatic cylinder element disposed at the work end of each overhead rail and attached to an overhead fixture of the ceiling; and
wherein each carriage is configured to slide along the overhead rail from the lift end to the work end upon actuation of the pneumatic cylinder element at the work end of the overhead rail to displace the work end of the overhead rail such that the overhead rail has a downward slope in a direction of the work end.

12. The assembly according to claim 11,
further comprising a biasing member attached to each carriage, wherein the biasing member is configured to bias the carriage toward the lift end of each overhead rail in a resting position.

13. The assembly according to claim 11, wherein the at least two overhead rails includes a first overhead rail and a second overhead rail;
wherein the overhead fixture includes a first support beam mounted to the ceiling of the work environment and attached to the lift ends of the first overhead rail and the second overhead rail; and
wherein the overhead fixture includes a second support beam mounted to the ceiling of the work environment at the work ends of the first overhead rail and the second overhead rail, wherein at least one pneumatic cylinder element has a lower attachment point in contact with at least one of the work ends of the first overhead rail and the second overhead rail and is attached to the second support beam at an upper attachment point.

14. The assembly according to claim 13, further comprising a third support beam mounted to the ceiling of the work environment at the work end of the first overhead rail, wherein the at least one pneumatic cylinder element is attached to the third support beam.

15. The assembly according to claim 14, wherein each overhead rail is fixedly attached to the first support beam at the lift end; and
wherein the work end of each overhead rail is configured to move in a vertical direction by actuation of the pneumatic cylinder element from a retracted position to an extended position, thereby moving the work end of the overhead rail in a downward direction.

16. The assembly according to claim 13, wherein a first component is configured to move through the travel distance to a work station along the first overhead rail;
wherein a second component is configured to move through the travel distance to the work station along the second overhead rail; and
wherein the first component and the second component are configured to be moved independently from each other.

17. The assembly according to claim 11, wherein the second distance between the work ends of the at least two overhead rails is adjustable by changing an orientation angle of one overhead rail of the at least two overhead rails.

18. A method for using a lift assist and transfer assembly to move a component through a travel distance, the method comprising:
selecting a component to be moved using a lift assist and transfer assembly comprising an overhead rail mounted to a ceiling of a work environment, a carriage, and a pneumatic cylinder element attached to an overhead fixture of the ceiling at one end of the overhead rail;
determining a weight of the selected component;
calculating a cylinder stroke length for the pneumatic cylinder element based on at least: (i) the travel distance between a loading area where the selected component is attached to the carriage at a lift end of the overhead rail of the assembly and a work station where the selected component is to arrive, and (ii) the determined weight of the selected component; and
actuating the pneumatic cylinder element by the calculated cylinder stroke length from a retracted position to an extended position, thereby moving a work end of the overhead rail in a downward direction to slide the carriage along the overhead rail through the travel distance to move the selected component to the work station.

19. The method according to claim 18, further comprising calculating the cylinder stroke length based on a target speed for the carriage moving through the travel distance.

20. The method according to claim 18, wherein the overhead rail is fixedly attached to a first support beam at the lift end of the overhead rail, the first support beam being mounted to the ceiling of the work environment; and
   wherein the overhead fixture includes a second support beam mounted to the ceiling of the work environment at the work end of the overhead rail, wherein the pneumatic cylinder element is attached to the second support beam at an upper attachment point.

* * * * *